Jan. 21, 1936.　　　T. J. SMULSKI　　　2,028,570
ELECTRIC CONTROL SYSTEM
Filed July 18, 1930　　　2 Sheets-Sheet 1
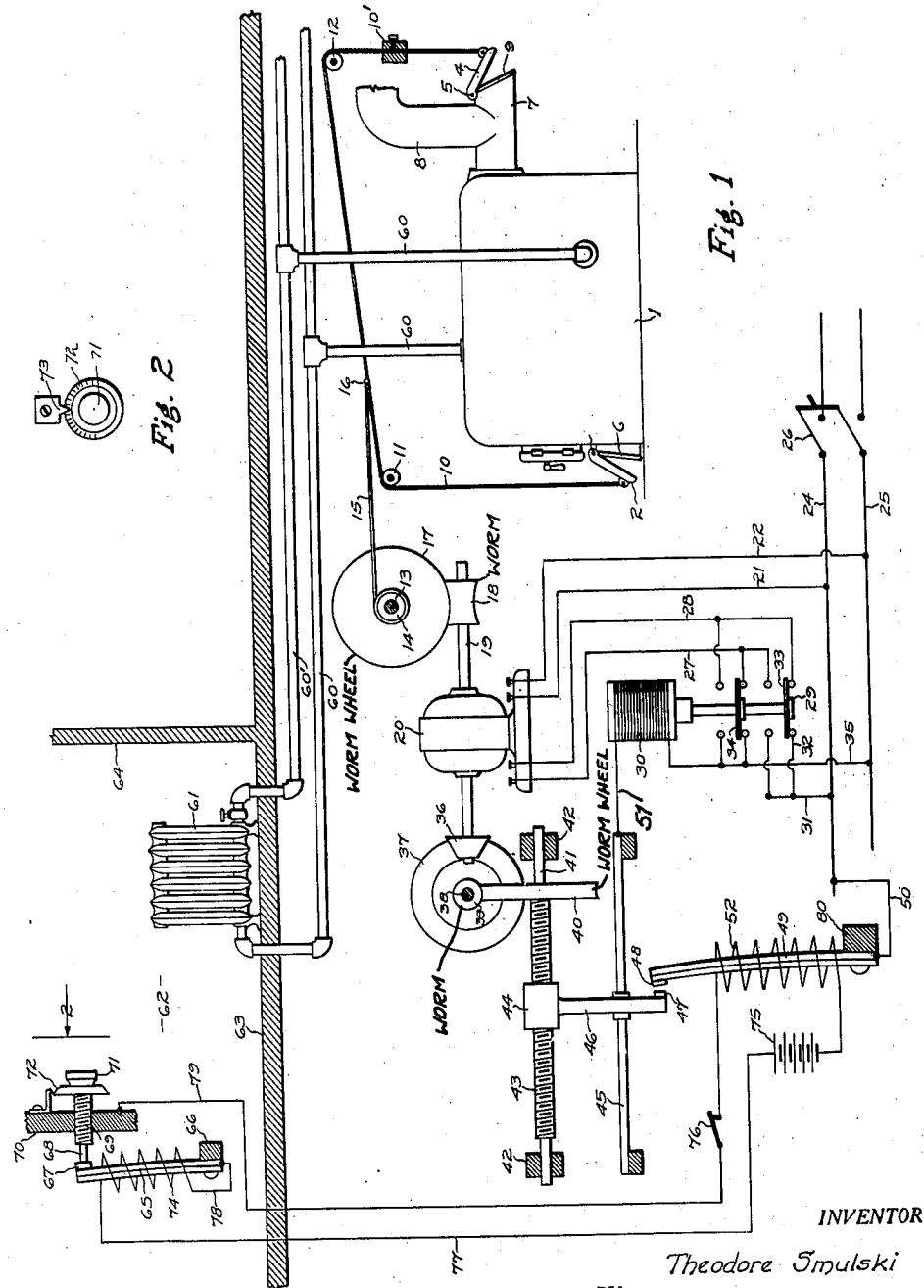
INVENTOR.
Theodore Smulski
BY
Slenghand Canfield
ATTORNEY.

Jan. 21, 1936. T. J. SMULSKI 2,028,570
ELECTRIC CONTROL SYSTEM
Filed July 18, 1930 2 Sheets-Sheet 2
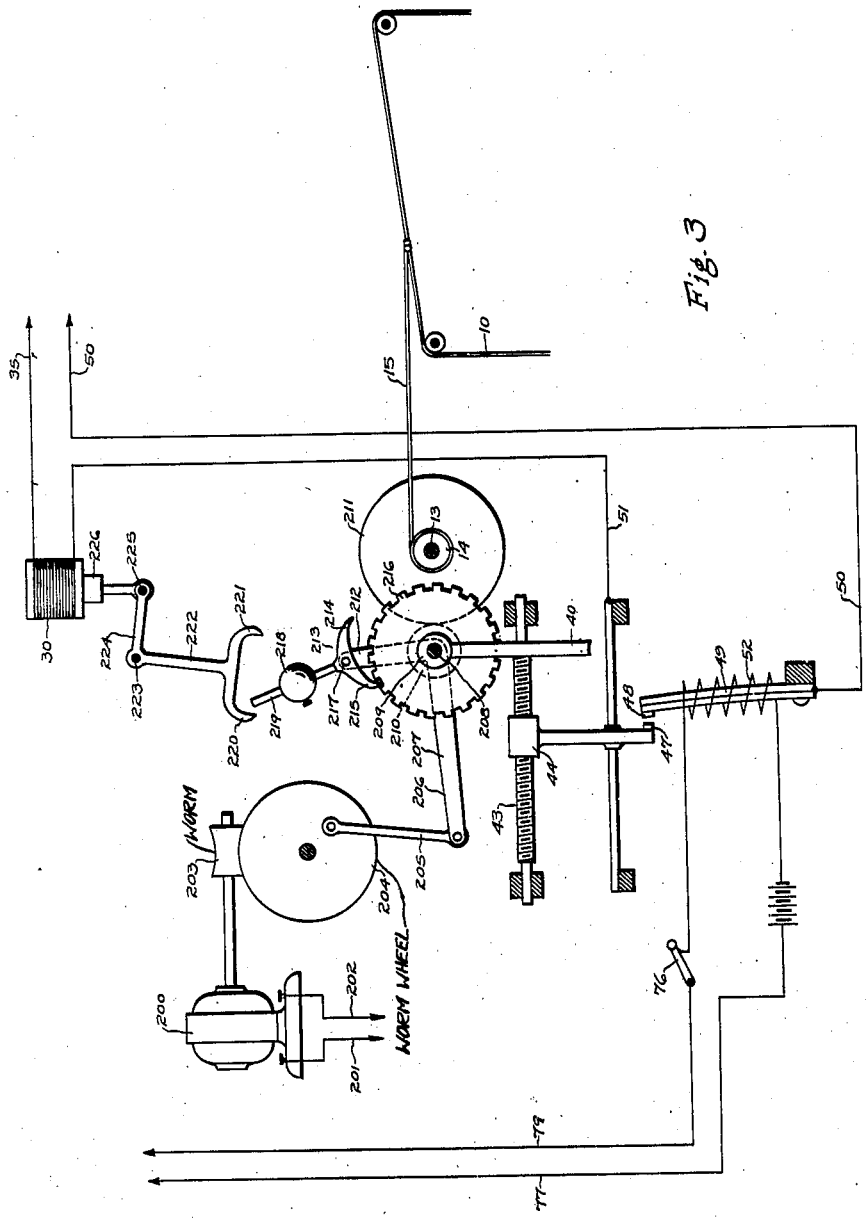
INVENTOR.
Theodore Smulski
BY
Slough and Caufield
ATTORNEY.

Patented Jan. 21, 1936

2,028,570

UNITED STATES PATENT OFFICE 2,028,570

ELECTRIC CONTROL SYSTEM

Theodore J. Smulski, Gary, Ind., assignor to The Anderson Company, Gary, Ind., a corporation of Indiana Application July 18, 1930, Serial No. 468,975

10 Claims. (Cl. 236—68)

This invention relates to automatic electric control systems and particularly to systems for automatically controlling the functions, operation etc. of remotely situated apparatus, machinery, or the like.

My invention is applicable to numerous uses and to the control of various remotely situated types of apparatus in which it may be desired to cause an element of the apparatus having a range of movement to take up any of the possible positions within its range.

In this application, however, I have chosen to illustrate and describe the invention as applied to controlling the heating plant for heating the interior of a building to maintain the temperature thereof substantially constant.

Heretofore, the heating plants of buildings have been automatically controlled by systems responsive to changes of temperature at a selected station in the building, to maintain the temperature within upper and lower predetermined limits. Upon attaining the predetermined maximum temperature, the furnace of the plant has been operated to reduce the rate of combustion therein, causing a gradual lowering of room temperature and upon reaching the lower or minimum predetermined temperature, the furnace has correspondingly been operated to increase the rate of combustion therein, thus the temperature of the room heated by the furnace must necessarily vary a number of degrees to effect the regulation of the furnace.

It is one of the objects of this invention to provide a control system responsive to the temperature of the room or rooms being heated which will operate the furnace in a manner to maintain a more nearly constant room temperature than has heretofore been attainable.

Another object is to provide such a control system which will operate to vary the rate of combustion in the furnace in response to exceedingly minute changes of room temperature to maintain the room temperature substantially constant.

Another object is to provide a system of control for heating plant furnaces operable to vary the rate of combustion in the furnace by controlling the position of a draft regulating element of the furnace and in which the said draft regulating element is controlled to take up successively any or all of the possible positions within its complete range of movement.

Another object is to provide a control system for heating plant furnaces of the class referred to in which the draft regulating element may be moved to vary the rate of combustion by minute increments or decrements over a part or all of its range of movement.

Another object is to provide an automatic control system whereby a remotely situated movable element of an apparatus may be caused to take up any of the possible positions within its range of movement in response to temperature changes at a proximate station.

Another object is to provide an automatic electric control system comprising a control element adapted to transmit therefrom over a suitable circuit, electric energy at a rate responsive to and in accordance with changes of a variable factor such, for example, as temperature; and a power supplying element adapted to be actuated by the said energy transmitted thereto; and a remotely situated element of an apparatus adapted to be moved by the power supplying element to take up any or all of the possible positions within its range of movement in response to and in accordance with the rates of energy transmitted to the power supplying element; the movable element of the apparatus being adapted to effect variations of the variable factor.

Others objects will be apparent to those skilled in the art to which my invention appertains.

My invention is fully disclosed in the following description taken in connection with the accompanying drawings, in which:

Fig. 1 is a diagrammatic illustration of an embodiment of my invention;

Fig. 2 is a view of a part of the apparatus of Fig. 1, being taken approximately from the plane 2 of Fig. 1 and illustrating an adjustment feature which I may employ;

Fig. 3 is a diagrammatic view similar to Fig. 1 but showing a modification.

Referring to the drawings, I have shown at 1 in simplified form a furnace of a type commonly employed for heating interiors of buildings and comprising a draft regulating door 2 pivoted to the furnace frame at 3 and a check draft door 4 pivoted at 5. Air for combustion purposes may enter through a doorway 6 and the products of combustion may pass out through a horizontal duct 7 and smoke pipe 8. The duct 7 has a doorway 9 beyond the pipe 8. A chain or cord 10 is connected at one end to the door 2, passes over pulleys 11 and 12 and is connected at the other end to the door 4, and may be provided with a counter-balancing weight 10'.

The construction thus far described is well known. Opening of the door 2 increases the draft and the combustion. Opening the door 4 bypasses the draft and reduces the combustion. By connecting the doors 2 and 4 by the chain 10, upon opening the door 2, the door 4 is correspondingly closed and vice versa. The parts just described constitute no essential part of my invention and are merely illustrative of one method of controlling the combustion of the furnace and any movable element or elements other than the doors 2 and 4 which may function to change the rate of combustion of the furnace may be employed.

The furnace is indicated as of the steam or hot water type and by means of pipes 60—60 supplies heat to a radiator or like device 61 in a room to be heated, indicated generally at 62, the floor 63 and one wall 64 thereof only being shown.

The following means is provided to move the combustion regulating elements such as the doors 2 and 4. A shaft 13 has mounted thereon a windlass 14 on which is wound a chain 15 connected at its free end as at 16 to a portion of the chain 10 between the pulleys 11 and 12. On turning the windlass 14 in alternate directions, the doorway 6 will be opened wider and the doorway 9 will be more nearly closed and vice versa.

Connected to the shaft 13 is a worm wheel 17 meshed with a worm 18 on a shaft 19 which is an extension of the shaft of an electric motor 20. The motor 20, in the embodiment of my invention illustrated, is preferably a direct current shunt field motor, the field being energized through wires 21 and 22 connected to electric supply mains 24 and 25 which, in the embodiment of my invention illustrated, are connected to a source of direct current supply by a main switch 26. The rotor circuit of the motor 20 is energized from the mains 24 and 25 through wires 27 and 28 connected to the contacts of a reversing switch indicated generally at 29 and operated by a solenoid type magnet having a winding 30. When the winding 30 is deenergized, the switch contacts take up the positions illustrated and current may flow from the main 24 through wires 31 and 32 and switch blade 33 to the motor by wire 28 and return therefrom by wire 27, through switch blade 34 and wire 35 to the main 25, starting and operating the motor in one direction of rotation. When the winding 30 is energized, the blades 33 and 34 will be lifted and current may flow from main 24 by wire 31, through the blade 33 to the wire 27, and through the motor 20, returning by wire 28 and blade 34, to wire 35 and main 25, stopping and reversing and operating the motor in the other direction of rotation. Reversing the motor 20 will change the positions of the doors 2 and 4 as will now be understood.

In the operation of my invention as illustrated, the motor 20 is repeatedly and continuously started, stopped and reversed, the rotation thereof in each direction continuing for a predetermined interval of time and, by means of a great reduction of movement through the worm gearing 18—17 and the relatively small windlass 14, will give to the doors 2 and 4 a very slight and preferably imperceptible amount of movement. The doors 2 and 4 thus continuously and repeatedly move farther open and farther closed by exceedingly small amounts.

The means for continuously reversing the motor will now be described. A bevel pinion 36 on the motor shaft is meshed with a large bevel gear 37 on a shaft 38 on which shaft is also mounted a worm 39 meshed in turn with a worm wheel 40 mounted on a shaft 41. The shaft 41 is rotatably supported in bearing elements 42—42 and has thereon a screw thread 43 with which is meshed a traveling nut 44. A stationary bar 45 is engaged by an arm 46 on the nut 44 to prevent the nut 44 from turning and to guide its travel. The arm 46 is provided with a contact 47 adapted to engage a contact 48 on one end of a bi-metallic thermo-responsive element 49, the other end of which is secured to a stationary support 80.

Current to energize the solenoid 30 may flow from the main 24 by wire 50 to and through the element 49, contacts 47 and 48, bar 45, wire 51 to and through solenoid 30 and thence by wire 35 to main 25. With the parts in the positions illustrated, and with the solenoid deenergized by the separated positions of the contacts 47 and 48, the motor 20 is energized in the direction to propel the nut 44 in the direction to close the contacts 47 and 48.

After rotation of the motor for a predetermined interval, the contacts 47 and 48 will be closed by movement of the contact 47 thereupon energizing the solenoid 30, reversing the connections on the switch 29 and stopping and reversing the motor 20. The motor then runs in the direction to separate the contacts 47 and 48, and after a predetermined interval of rotation, separates them, deenergizing the solenoid 30 and stopping the motor and reversing it, and the cycle thus described is continuously repeated.

The bi-metallic thermo-responsive element 49 has associated therewith a heating coil or other heating element 52 to which heat is supplied in a manner to be described in accordance with the temperature of the room 62. The well known properties of bi-metalic thermo-responsive elements will cause the element 49 to bend, to the left or to the right as viewed in Fig. 1, in accordance with the temperature thereof derived from the heating element 52. An increase in the temperature of the element 49 will cause it to become more bent or bend to the left and move the contact 48 toward the contact 47 and the nut 44 will travel farther to the left before the contact 47 disengages the contact 48 to effect the next reversal of the motor and the next breaking of the contacts 47 and 48. Thereafter the successive making and breaking of the contacts 47—48 by movements of the nut 44 will occur with the nut 44 in an average position or in a zone of movements farther to the left on the screw 43 than before. The rotations of the screw 43 necessary to move the nut 44 on its new zone of movements being effected by the motor 20, the windlass 14 and the doors 2 and 4 will correspondingly be moved to new positions or zones of movement; and the direction of winding of the windlass 14 may be arranged to cause the door 2 to be opened wider and the door 4 to be more nearly closed, as will be understood.

The means for supplying heat to the thermo-responsive element 49 will now be described. In the room indicated at 62, a bi-metallic thermo-responsive element 65 is fixed at one end as at 66 and on its other end carries a contact 67, movable in response to the bending movements of the element 65. A stationary contact 68 on the end of a screw 69 threaded in a stationary support 70 may be engaged by the contact 67. The screw 69 may be adjustably rotated to adjust the position of the contact 68 by means of a knob 71 and a dial 72 on the screw. The dial 72 may be graduated in degrees to indicate desired room temperatures and a stationary pointer 73 may indicate temperature adjustments of the dial. Associated with the bi-metallic element 65 is an electric heating coil or other electric heating means 74. Preferably the heating element 74 is connected in series with the heating element 52 of the bi-metallic element 49 and current is supplied thereto by a source of supply such as a battery 75. In operation, upon closure of a control switch 76, current may flow from the battery 75 by wire 77 through the heating element 74 and by wire 78 through the bi-metallic element 65, as a conductor, to the contacts 67—68, support 70, wire 79, switch 76 and through the heating element 52 back to the battery 75. The current thus flowing heats the bi-metallic element 65 causing it to bend sufficiently to break the contacts 67—68 and interrupt the current flow. The element 65 then cools down and again closes the contacts 67—68. Thus the repeated closing and opening of the contacts 67—68 sends a series of current impulses to the heating element 52. The construction of the heating element 52 and bi-metallic element 49 and asociated parts is, by well known means, such as to provide a predetermined amount of heat storage capacity or thermal inertia so that the element 49 is brought up to a substantially constant temperature by the current impulses and so that for a series of impulses of uniform duration and intervals between impulses, the element 49 will remain substantially immovable and the contact 48 thereon will take up a substantially stationary position.

The bi-metallic element 65 and its heating winding 74 are designed with very low thermal inertia so that the contact 67 will be moved toward and from the contact 68 upon slight changes of temperature of the element 65.

Furthermore, the element 65 will be thermally responsive to temperature derived from the room 62 in which it is situated as well as from the heating element 74 thereon.

Upon a change of temperature in the room 62, however slight it may be, the temperature of the element 65 will be correspondingly changed thereby. If the room temperature falls, the temperature of the element 65 will accordingly fall and current in the heating element 74 must flow for a longer period before the element 65 will be heated to the temperature at which it will break the contacts 67—68. As a result, the current impulses will be of longer duration and the amount of heat supplied to the heat element 52 will be greater and the element 49 and contact 48 will consequently take up new positions farther to the left, as described above.

The converse action will result if the temperature in the room 62 rises.

Furthermore, as will now be clear, by adjusting the position of the contact 68 by the knob 71 and dial 72, the duration of the impulses sent out by the contacts 67—68 may be adjustably varied, because, if the contact 68 be adjusted closer to the contact 67, by turning the dial 72 to indicate a lower temperature, the element 65 must be heated to a higher temperature before it can break the contacts 67—68, which results in longer current impulses sent to the heating element 52.

From the foregoing description it will now appear that minute changes of temperature in the room 62 will effect a change in the duration of the impulses of current caused by the continuous making and breaking of the contacts 67—68 and effect a corresponding change in the amount of heating of the element 49, and a change in the position of the contact 48. This in turn results in a change of position of the doors 2 and 4 of the furnace, as above described, and they may occupy positions anywhere in the range from fully closed to fully open. It will also be clear that the doors 2 and 4 of the furnace will take up the positions necessary to maintain a substantially constant temperature in the room 62.

In the modification of my invention shown in Fig. 3, the motor 200 is not periodically reversed but runs continuously in one direction from current in supply wires 201 and 202 connected to a suitable source of supply. The motor drives a worm 203 and worm wheel 204. A connecting rod 205 on the worm wheel 204 reciprocates the long arm 206 of a bell crank 207, rotatably mounted on a shaft 208 to oscillate thereon. Upon the shaft 208 is rigidly mounted a worm 209 meshed with the worm wheel 40 on a threaded shaft 43 with the threads of which is meshed a traveling nut 44 carrying a contact 47.

On the shaft 208 is also rigidly mounted a gear 210 meshed with a gear 211 upon which is also a windlass 14 having wound thereon a cord or chain 15 connected to a furnace door operating chain 10.

The gear 211 and windlass 14 are both rigidly connected to a shaft 13.

The short arm 212 of the bell crank 207 is substantially vertically disposed and on its upper end has pivoted thereto a double pawl 213 having pawl prongs 214 and 215.

Rigidly mounted on the shaft 208 is a sprocket wheel 216, the teeth of which are adapted to be alternately engaged by the pawl prongs 215 and 214 in alternate rocked positions of the pawl 213 about its pivot connection 217 with the bell crank arm 212. A weight 218 on the pawl 213 is adapted to be shifted from one side to the other of the pivot 217 upon rocking movement of the pawl 213 to hold the prongs of the pawl securely against the teeth of the ratchet wheel 216 to cause them to ratchet therewith when the bell crank 207 is oscillated.

The weight 218 is preferably mounted on a stem 219 of the pawl 213 and the stem 219 projects therethrough and is adapted at its end to be engaged by the fingers 220 and 221 of a fork on the end of a bell crank arm 222 pivotally mounted at 223, the other arm 224 of the bell crank being connected at 225 to the plunger 226 of a solenoid 30. Energization of the solenoid 30, to lift the plunger 226, will rock the arm of the bell crank and cause the finger 220 to engage the stem 219 and rock the pawl 213 to its other position to cause and remove the prong 215 from the ratchet wheel 216 and engage the prong 214 therewith. De-energization of the solenoid 30 will correspondingly, by means of the finger 221 rock the pawl back to the position illustrated.

The contact 47 on the nut 44 as above described is adapted to engage a contact 48 on a bi-metallic thermostatic element 49 by the same mode of operation described above in connection with Fig. 1, the same reference characters being used for these parts as in Fig. 1. On closing the contacts 47 and 48, current may flow to energize the solenoid 30 from a suitable supply main through wire 50, the thermostatic element 49 as a conductor, contacts 47 and 48, conductor 31, solenoid 30 and by wire 35 to a suitable source of supply.

The element 49 has a heating coil or other heater 52 adapted to be heated by impulses of current sent over the wires 77 and 79 similarly as described in connection with Fig. 1 for the parts in that figure bearing the same reference numerals. The operation of the modification shown in Fig. 3 is as follows. With the parts in the position shown, the continuously rotating motor 200 oscillates the bell crank arm 212, causing the prong 215 of the pawl 213 to notch the ratchet wheel 216 ahead in a counter-clockwise direction, thus winding up the chain 15 on the windlass 14 and operating the chain 10 as in connection with Fig. 1 to move the doors 2 and 4 respectively to more nearly closed and more nearly open positions, in the regulation of the furnace draft. The rotary movement of the ratchet wheel 216, transmitted through the worm 209 and worm wheel 40 will move the nut 44 and thereby move the contact 47 to engage the contact 48. This will energize the solenoid 30 and, as above described, throw the pawl 213 to its other position. Thereafter the continuous oscillation of the bell crank arm 212 will cause the pawl to notch the ratchet wheel ahead in the reverse or clockwise direction, unwinding the chain 15 from the windlass 14 and moving the furnace doors in the other direction. The reverse movement of the ratchet wheel 216 also, as will be understood, causes the contact 47 to disengage the contact 48, de-energizing the solenoid 30 and throwing the pawl 213 to its position illustrated.

This cycle of operations repeats as in Fig. 1. The contact 48 of the element 49 may have its position changed in response to the changes of current impulses coming on the wires 77 and 79 as in connection with Fig. 1.

I am aware that some of the elements of the mechanism shown and described hereinbefore have been employed heretofor, as for example by F. Rieber in his Patent No. 1,664,265, March 27, 1928. In that patent as in Fig. 1 herein, a motor is periodically reversed by means of a reciprocatively moving contact controlling the motor circuit, the contact being reciprocated by a nut and screw operated by the motor itself through reduction worm gearing; the supply circuit to the motor being successively periodically reversed by a magnetic switch energized and de-energized by said contact. And furthermore, the mating contact engaged by the said reciprocating contact is adapted to change its position in response to changes of a variable factor such as a changing liquid level whereby the zone of reciprocating movements of the reciprocating contact is changed.

In the prior art as exemplified by said patent, an indication or measurement is effected in correspondence with the displacement of said zone of reciprocations of the reciprocatory contact.

In the instant invention, some of the elements of the patent referred to have been employed and will be readily recognized.

The advance in the art of the instant application and the departure from the said patent and like prior art is formulated in the appended claims.

My invention is not limited to the exact details of the mechanism diagrammatically illustrated nor of the system of electric connections therefor. Many changes therein and modifications thereof may be made within the scope of my invention without departing from the spirit thereof or sacrificing its advantages.

I claim:

1. In an automatic control system, a source of power, a movable element adapted to be periodically reversably moved thereby, a movable contact adapted to be reciprocatively moved by the movable element, a relatively stationary contact engageable thereby, electrically operated means controlled by the contacts and adapted to effect periodic reversals of the movable element within a predetermined zone of movement, shifting means for shifting the said stationary contact toward or from the movable contact to shift the zone of said movement, said shifting means comprising a thermostatic element movingly associated with said stationary contact, and automatic means for variably heating the thermostatic element and movable therewith according to variations of a variable quantity controllable by said movable element.

2. In an automatic control system for an apparatus adapted to supply heat at a point of use, a movable element of the heat supplying apparatus adapted to vary the heat output thereof in accordance with its position in a range of movement, the movable element being adapted to be periodically reversably moved within a zone of movement in said range, a source of power for moving the movable element, a movable contact adapted to be reciprocatively moved by the source of power, a relatively stationary contact engageable thereby, electrically operated means controlled by the contacts and adapted to effect periodic reversals of the movable element and the movable contact within predetermined zones of movement respectively, and shifting means for shifting the said stationary contact toward or from the movable contact to shift the zone of contact movement, said shifting means comprising a thermostatic element movingly associated with said stationary contact, and automatic means for heating said thermostatic element and movable therewith variably in response to changes of temperature at the point of use.

3. In an automatic control system for an apparatus adapted to supply heat at a point of use, a movable element of the heat supplying apparatus adapted to vary the heat output thereof in accordance with its position in a range of movement and adapted to be periodically reversably moved within a zone of movement with said range, a movable contact adapted to be reciprocatively moved within a zone of movement, a source of power for reciprocatively moving the said element and said contact, a relatively stationary contact engageable by the movable contact, electrically operated means controlled by the contacts and adapted to effect periodic reversals of the said element and said contact within said predetermined zones of movement respectively, shifting means for shifting the said stationary contact toward or from the said movable contact to shift the zone of contact movement and the zone of movement of the said element, said shifting means comprising a thermostatic element movingly associated with the stationary contact, and automatic means movable with the thermostatic element for variably heating the thermostatic element in response to variations of temperature at the point of use.

4. In an automatic control system for an apparatus adapted to supply heat at a point of use, a movable element of the heat supplying apparatus adapted to vary the heat output thereof in accordance with its position in a range of movement and adapted to be periodically reversably moved within a zone of movement in said range, a movable contact adapted to be moved over a range of movement and to be reciprocatively moved within a zone in said range, a source of power for reciprocating the movable element and the movable contact, mechanical connections between the said element and said movable contact whereby they may be reciprocated concurrently by said source, a relatively stationary contact engageable by the movable contact, electrically operated means controlled by the contacts and adapted to effect periodic reversals of the movable element and the movable contact within predetermined zones of movement thereof respectively, shifting means for shifting the said stationary contact toward or from the movable contact to shift the zone of contact movement and the zone of movement of the element, said shifting means comprising a thermostatic element movingly associated with said stationary contact, and automatic means movable with the thermostatic element for variably heating the said thermostatic element in response to variations of temperature at the point of use.

5. In an automatic control system, a source of power, a movable element and a movable contact adapted each to move through a range of movement and to be periodically reversably moved in a zone of movement in said range, a source of power for concurrently periodically moving the said element and the said contact, a relatively stationary contact engageable by the movable contact, electrically operated means controlled by the contacts and adapted to effect the said periodic reversing movement of the contact and element within their respective zones of movement, shifting means for shifting the said stationary contact toward or from the movable contact to shift the zones of said movement, said shifting means comprising a thermostatic element movingly associated with the movable contact, and automatic means movable with the thermostatic element for variably heating the thermostatic element in response to variations of a variable quantity controllable by said movable element.

6. In an automatic control system, a source of power, a movable element adapted to be periodically reversably moved thereby, a movable contact adapted to be reciprocatively moved by the movable element, a relatively stationary contact engageable thereby, electrically operated means controlled by the contacts and adapted to effect periodic reversals of the movable element within a predetermined zone of movement, shifting means for shifting the said stationary contact toward or from the movable contact to shift the zone of said movement, said shifting means comprising a thermostatic element movingly associated with said stationary contact, automatic means for variably heating the thermostatic element according to variations of a variable quantity controllable by said movable element, comprising a pair of make-and-break contacts, means for operating the contacts in response to variations of said variable quantity and an electric heating circuit for the first-mentioned thermostatic element controlled by said last-mentioned contacts.

7. In an automatic control system for an apparatus adapted to supply heat at a point of use, a movable element of the heat supplying apparatus adapted to vary the heat output thereof in accordance with its position in a range of movement, the movable element being adapted to be periodically reversably moved within a zone of movement in said range, a source of power for moving the movable element, a movable contact adapted to be reciprocatively moved by the source of power, a relatively stationary contact engageable thereby, electrically operated means controlled by the contacts and adapted to effect periodic reversals of the movable element and the movable contact within predetermined zones of movement respectively, shifting means for shifting the said stationary contact toward or from the movable contact to shift the zone of contact movement, said shifting means comprising a thermostatic element movingly associated with said stationary contact, automatic means for heating said thermostatic element variably in response to changes of temperature at the point of use, comprising a second thermostatic element subjected to the changes of temperature at the point of use, a pair of make-and-break contacts controlled thereby and an electric heating element for each thermostatic element controlled by the make-and-break contacts.

8. In an automatic control system for an apparatus adapted to supply heat at a point of use, a movable element of the heat supplying apparatus adapted to vary the heat output thereof in accordance with its position in a range of movement and adapted to be periodically reversably moved within a zone of movement with said range, a movable contact adapted to be reciprocatively moved within a zone of movement, a source of power for reciprocatively moving the said element and said contact, a relatively stationary contact engageable by the movable contact, electrically operated means controlled by the contacts and adapted to effect periodic reversals of the said element and said contact within said predetermined zones of movement respectively, shifting means for shifting the said stationary contact toward or from the said movable contact to shift the zone of contact movement and the zone of movement of the said element, said shifting means comprising a thermostatic element movingly associated with the stationary contact, automatic means for variably heating the thermostatic element in response to variations of temperature at the point of use, comprising a second thermostatic element subjected to the changes of temperature at the point of use, a pair of make-and-break contacts controlled thereby and an electric heating element for each thermostatic element controlled by the make-and-break contacts.

9. In an automatic control system for an apparatus adapted to supply heat at a point of use, a movable element of the heat supplying apparatus adapted to vary the heat output thereof in accordance with its position in a range of movement and adapted to be periodically reversably moved within a zone of movement in said range, a movable contact adapted to be moved over a range of movement and to be reciprocatively moved within a zone in said range, a source of power for reciprocating the movable element and the movable contact, mechanical connections between the said element and said movable contact whereby they may be reciprocated concurrently by said source, a relatively stationary contact engageable by the movable contact, electrically operated means controlled by the contacts and adapted to effect periodic reversals of the movable element and the movable contact within predetermined zones of movement thereof respectively, shifting means for shifting the said stationary contact toward or from the movable contact to shift the zone of contact movement and the zone of movement of the element, said shifting means comprising a thermostatic element movingly associated with said stationary contact, automatic means for variably heating the said thermostatic element in response to variations of temperature at the point of use, comprising a second thermostatic element subjected to the changes of temperature at the point of use, a pair of make-and-break contacts controlled thereby and an electric heating element for each thermostatic element controlled by the make-and-break contacts.

10. In an automatic control system, a source of power, a movable element and a movable contact adapted each to move through a range of movement and to be periodically reversably moved in a zone of movement in said range, a source of power for concurrently periodically moving the said element and the said contact, a relatively stationary contact engageable by the movable contact, electrically operated means controlled by the contacts and adapted to effect the said periodic reversing movement of the contact and element within their respective zones of movement, shifting means for shifting the said stationary contact toward or from the movable contact to shift the zones of said movement, said shifting means comprising a thermostatic element movingly associated with the movable contact, automatic means for variably heating the thermostatic element in response to variations of a variable quantity controllable by said movable element, comprising a pair of make-and-break contacts, means for operating the contacts in response to variations of said variable quantity, and an electric heating circuit for the first-mentioned thermostatic element controlled by said last-mentioned contacts.

THEODORE J. SMULSKI.